Figure 6:
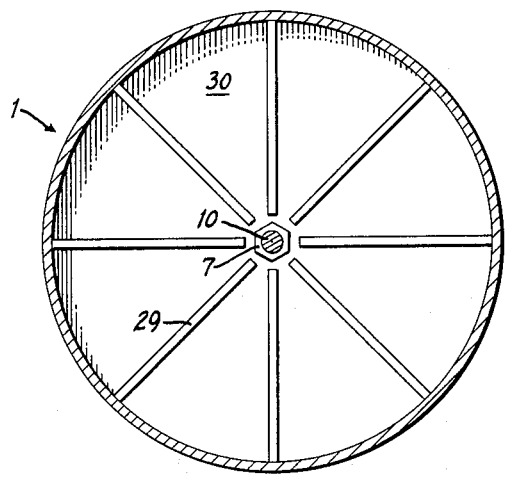

Feb. 8, 1966 P. LOMB 3,233,825
SELF-CONTAINED CENTRIFUGE
Filed Feb. 11, 1963 2 Sheets-Sheet 1
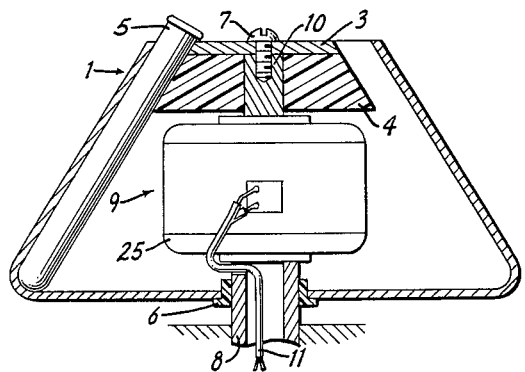
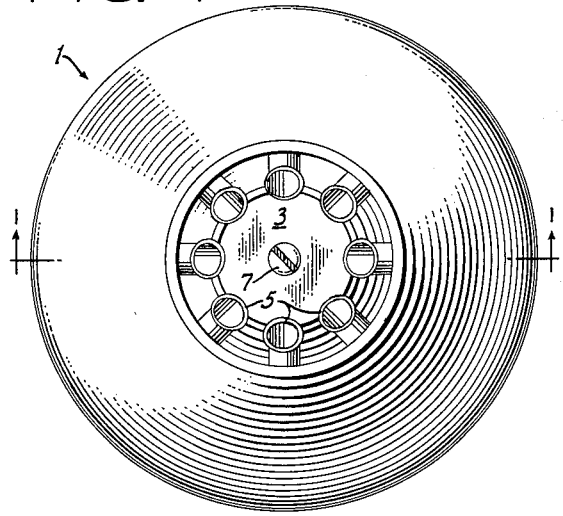
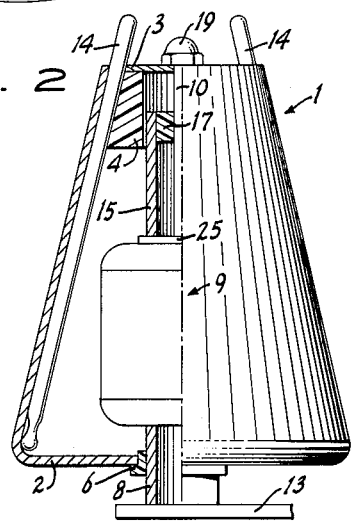
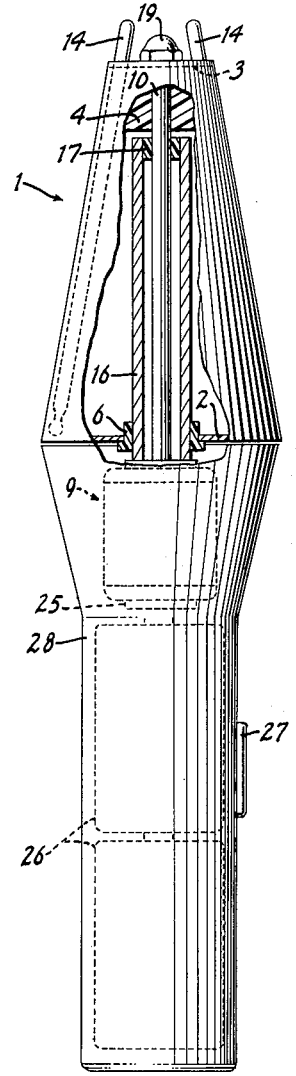
INVENTOR.
PAUL LOMB Feb. 8, 1966   P. LOMB   3,233,825
SELF-CONTAINED CENTRIFUGE
Filed Feb. 11, 1963   2 Sheets-Sheet 2

*INVENTOR.*
PAUL LOMB

United States Patent Office 3,233,825
Patented Feb. 8, 1966

3,233,825
SELF-CONTAINED CENTRIFUGE
Paul Lomb, 22 Murana Road, Earlwood,
New South Wales, Australia
Filed Feb. 11, 1963, Ser. No. 257,648
3 Claims. (Cl. 233—24)

The principal object of this invention is to provide for a comparatively small size centrifuge of light weight construction which can be driven by small motors which in turn can be operated by dry cell batteries. The centrifuge is primarily adaptable for tubular objects and can be used to shake down thermometers or to apply centrifugal force to test tubes for chemical or medical tests. The centrifuge comprises a rotatable fruostoconical shell provided with a bearing placed in the center of the base of the frustocone.

Frustoconical shells have been used in the past for centrifuges suitable as thermometer shakers. All of them require heavy drive shafts to provide the necessary rigidity for operation at high speeds. The heavy drive shafts in turn require large motors which could not operate on dry cell batteries. By providing a bearing in the center of the base of the frustocone the required rigidity and guidance is obtained while using light construction for the frustoconical shell and a comparatively thin drive shaft. This bearing permits the rotation of the shell around a stationary hollow shaft attached to the mounting of the entire assembly.

The principle of rotating masses teaches us that the centrifugal force is the greatest at the maximum rotating radius where the peripheral speed is greatest. This is at the bottom rim of the outer shell at the wider end of the cone. The slightest dynamic unbalance, difference in weight distribution of the specimen or of the rotating parts will result in a pair of strong forces perpendicular to the shaft. Such forces would strain the motor bearings and bend the motor shaft. Where e.g. the rotating head is supported by the motor shaft and motor bearing, they have to be of heavy construction. This is the picture one can see in the prior art. The heavy components in turn require high power rated motors at the high speeds required for the desired centrifugal effect. In contrast thereto the herein claimed invention permits the construction of light weight compact assemblies with small motors which in turn can be driven by dry cell batteries of the size used in flashlights and similar items. The improvements presented herein permit the construction of apparatus useful for shaking down thermometers, which are of small size and can be used not only by hospital nurses and doctors, but by sick persons themselves or even by children. It is also possible to use these self-contained high speed centrifuges to precipitate suspended particles from liquid suspensions or to separate mixtures of liquids of different specific gravity. They can be used by medical or chemical laboratories, by educational institutions, by students for home experiments and in educational kits. Other uses may be obvious to those skilled in the art.

The wider end of the frustocone is closed with a plate support. This plate support can be a disk or a section of a disk or can have a wheel spike construction. In the center of this plate is the bearing, the plate acting as a bearing support. The bearing may be constructed of any material having low friction resistance. Teflon is a suitable material for the bearing. Another example for suitable bearing material is a linen based phenolic thermosetting plastic material. The bearing surrounds a stationary supporting hollow shaft and permits the rotatable frustoconical shell head to rotate around the same.

The narrower end of the frustocone has also a supporting closing plate. This plate may also have a disk-like shape or be a section of a disk or may have a wheel spike construction. It is also provided with entrance holes for the tubular objects to enter the inside of the shell. In the favored embodiment of this invention the tubular objects, like the thermometers or test tubes are on the inside of the shell, and are placed in parallel position to the shell wall. The narrow end supporting closing plate is attached by suitable means to the drive shaft extension of the motor. When the drive shaft requires support, the drive shaft rotates within a stationary supporting hollow shaft which in turn is attached to the motor housing or to the housing of the entire assembly. In such cases at least one additional bearing is provided between said stationary supporting hollow shaft and the rotating motor shaft or its extension. If the drive shaft is discontinuous, coupling of its sections and one additional bearing for each section is of advantage.

In the top section at the narrower end of the frustocone there is guidance provided for the tubular objects to be contrifuged. This guidance is called herein as tube guide. The tube guide is advantageously constructed of plastic foam, which provides suitable guidance, has light weight and acts as cushion for the glass of the tubular objects protecting them against breakage. The tubular objects are placed in the tube guides. In one embodiment of this invention the upper portion of the tube guide acts simultaneously as the narrow end supporting closing plate.

The rotating force is transmitted to the frustoconical shell by the coupling of its narrower end supporting closing plate to the drive shaft.

Whereas in the simplest form of construction the bearing support, which is the closing plate for the wider end of the frustocone, is placed at the wider end of the frustocone, in an alternative embodiment of the invention this may be placed in any portion of the wider half of the frustocone, i.e. not necessarily at the wider end.

It is essential to the operation of this invention that the driving motor shaft be solidly attached to the shell by suitable means. As outlined above, for this purpose the narrower end closing plate (disk, section of a disk, wheel spikes) or the tube guides (molded plastic foam) can be utilized to achieve this goal. In an alternative solution of the problem the entire shell and tube guides can be a single piece molded plastic.

The illustrative FIGURE 1, FIGURE 2 and FIGURE 3 illustrate three embodiments of this invention, without limiting its scope.

In FIGURE 1, the motor 9 is mounted on the inside of the frustoconical rotatable shell 1. The motor is mounted on the supporting hollow shaft 8, around which the wider end closing plate 2 is placed with its center bearing 6. The electrical current supply wires 11 reach the motor 9 through the hollow supporting stationary shaft 8. The driving motor shaft is 10. In this illustrative figure, there is no hollow shaft support for the motor shaft. The motor shaft 10 extends upward from the motor 9 to the narrower end supporting closing plate 3. The wider end base plate support, which acts as bearing support or retainer, 2 is at the lower and wider end of the frustocone. The narrower end supporting closing plate 3 at the upper and narrower end of the frustocone may be eliminated in an alternative solution of this FIGURE 1 and replaced by the test tube guide 4. Test tube guide 4, however, is an essential part of this assembly and it could be shaped also as a thermometer guide. 5 illustrates a test tube. The shell bearing is 6, which could also be called a bushing. 7 is a fastener which provides the driving connection between the shell and the motor shaft 10. The motor housing is 25. One of the unique features of this invention is that it permits the compact assembly illustrated by this embodiment.

FIGURE 2 shows another illustration of the embodiments of this invention. Also here the motor 9 is placed inside the frustoconical shell 1. The numbers 2, 3, 4, 6, 10 and 25 designate similar parts as in FIGURE 1. 13 is a stationary support plate for the entire assembly. 14 is a thermometer, which replaces here the test tube of FIGURE 1. 15 is a second stationary hollow shaft, which supports the sleeve bearing 17 (bushing). 19 is a cap nut. FIGURE 2 illustrates the use of a second bearing, acting as sleeve bearing for the long motor shaft and the use of a second stationary hollow shaft as a bearing retainer or bearing support.

The motor bearings are not shown in FIGURES 1, 2 or 3, as they are integral parts of the motors.

FIGURE 3 illustrates simultaneously another embodiment of this invention and a schematic assembly utilizing said embodiment.

In FIGURE 3 the motor 9 is mounted below the frustoconical rotatable shell 1. 16 is a stationary hollow shaft mounted on the motor housing 25 and acts as support for the upper sleeve bearing 17. 2, 3, 4, 6, 10, 14 and 19 designate similar parts as in FIGURE 1 and FIGURE 2 respectively. In FIGURE 3 the frustoconical shell rotates around the stationary hollow shaft 16 by the aid of the shell bearing 6 and its rotational drive derives from the motor shaft 10 through the fastening connection provided by the cap nut 19 to the narrower end supporting closing plate 3. 9 is the motor. 26 illustrates the dry cell batteries. 27 is a starting switch, mounted on the side of the casing 28. 28 is the housing for the lower part of the assembly.

FIGURE 4 illustrates a top view. 1 is the frustoconical shell. 5 shows the position of the test tubes or thermometers in a schematic manner. 3 is the upper enclosure of the frustocone, herein also called the narrower end supporting closing plate. 7 is the fastener providing the driving connection with the motor shaft.

In FIGURES 1, 2 and 3 the seeming arrangement is around a vertical drive shaft. This is not a requirement of the invention as the drive shaft may be at an angle to the vertical and may even be horizontal.

The tubular objects are supported advantageously by suitable means at the wider end of the frustocone. Where the bearing retainer is a base plate, the tubular objects can rest on same. The use of a resilient cushion padding is recommended for the support.

A few additional data are given below, to facilitate understanding of this invention. Figures mentioned are for the purpose of illustration and not for limiting the scope of the invention.

The drive shaft can be connected solidly to the rotating frustoconical shell by many suitable means. Examples are: (a) The end of the motor shaft has a tapped hole and a screw fastens the narrow end closing plate to the shaft. (b) The end of the motor shaft has a shoulder, the portion of the shaft above the shoulder is threaded and a nut fastens the narrow end closing plate of the shell to the motor shaft. (c) The tube guide forms the narrow end closing plate of the shell and is fastened to the driving shaft by glueing or a cross pin, amongst others. (d) An additional nut provides a shoulder for the drive shaft and assists in fastening the shell to the drive shaft, which is threaded at its upper end.

When fever thermometers are to be shaken down, the force required for success is measured in relative centrifugal force (RCF). The RCF is a function of the r.p.m. of the drive shaft and of the radial distance from the center of the drive shaft to the tip of the thermometers. In the event test tubes are used, the tip of the test tube replaces the tip of the thermometer. In an illustrative embodiment of this invention the r.p.m. was about 3500 and the radial distance 1¼", yielding about 435 RCF. In the case of a thermometer the shaking down effect is not sensitive to the angle of the thermometer forms with the center line of the rotation. The entire unit can rotate in any position from vertical to horizontal, as long as provision is made that the tubular object will not fall out of the assembly when in stationary condition.

Shell walls can range e.g. from about 0.020 to about 0.065 inch in thickness, depending on construction material and motor used. The length of the shell wall for a 4¼" long thermometer is about 4 inches. For a thermometer shaker the narrow end of the frustocone can be about 1 inch and the wider end of the frustocone about 2 to 2½ inches in diameter. A one inch long thermometer guide works satisfactorily. A model made according to FIGURE 2, as a thermometer shaker, weighed for the entire assembly about 4 to 5 ounces. For a 2½ inch diameter wider end frustocone r.p.m.'s of 3000 to 3500 worked satisfactorily. For battery operations 3 to 6 volt batteries operated successfully.

The number of tube guide openings can vary, as desired, as long as they are placed to balance properly. The shell wall may be discontinuous (e.g. it could be perforated or slotted) as long as this does not influence strength of construction and wind resistance too disadvantageously.

In an alternative modification of FIGURE 3, the stationary hollow shaft surrounding the drive shaft may be fastened to the casing, instead of to the motor housing. The casing is the housing for the assembly.

Figure 5:
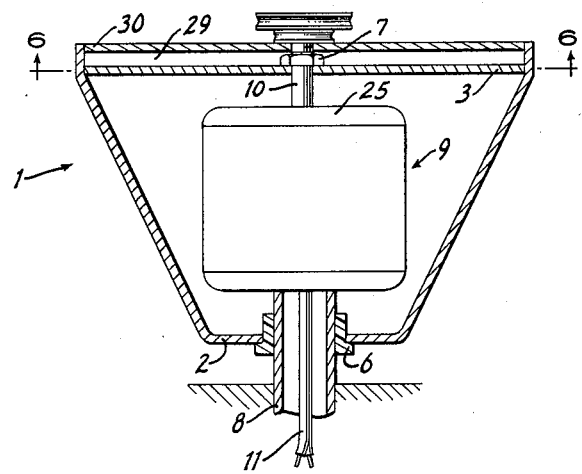

Another embodiment of the construction relates for making hematocrit determinations where the blood sample is contained in a capillary tube for centrifugation. FIGURE 5 and FIGURE 6, illustrate the rotating shell 1 surrounding the motor having a closing plate 3 connected by fastener 7 to the motor shaft 10, the base plate 2 acts as a bearing support or retainer. The shell bearing 6 rotates around a hollow supporting stationary shaft 8 which is attached solidly to the motor housing 25 and the electrical current supply wires reach the motor through the hollow supporting stationary shaft 8.

The capillary test tubes 29 are placed in substantially perpendicular position to the driving shaft, on the upper surface of the shell closing plate, in a groove substantially radial.

A cover plate 30 and a wall on the outer periphery of the shell prevents the tubes to fly out during rotation. A knob fastener not shown is attached to cover plate for removal of such for loading and unloading of test tubes.

The r.p.m. in such centrifuge is about minimum 7000 in order to provide sufficient centrifugation when it is used to obtain hematocrits. The use of such device however should not be restricted to hematocrits and the application of the invention is unlimited.

The shape of the shell should not be limited, it can be an inverted frustocone, bowl cylinder or any suitable shape to connect the shaft of the motor and lower rotating bearing.

The use of series or compound connected motor with high starting torque is an advantage.

It is apparent that many other changes can be made in details without departing from the scope of the invention and that it is intended that the scope of claims shall be adequate to cover any such modifications, substitutions, to accomplish the same effects in substantially the same way as they are accomplished by the apparatus which is subject of this specification. The accompanying drawings are to be interpreted as illustrative and not in a limiting sense.

Having thus disclosed my invention, I claim as new and desire to protect by Letters Patent:

1. A centrifuge comprising a vertical cylindrical tubular post, an electric motor including a vertical drive shaft coaxial with said post, a frusto-conical shell coaxial with said drive shaft and including a first end wall having a central opening formed therein, a bearing collar registering with said central opening and rotatably engaging said tubular post, means for effecting a drive coupling between said drive shaft and said shell adjacent to an end of said shell opposite said first end wall, said drive motor being disposed within and spaced from the peripheral wall of said shell and being mounted on said post, and a guide member within said shell mounted over said drive motor and adapted to seat the upper end of a tubular object the contents of which are to be centrifuged.

2. A centrifuge according to claim 1 and wherein said guide member surrounds and is mounted on said drive shaft.

3. A centrifuge according to claim 2 and including an electric cable connected to said motor and extending through said post.

References Cited by the Examiner

UNITED STATES PATENTS

| 1,730,776 | 10/1929 | Lundgren | 233—26 |
| 1,769,889 | 7/1930 | McClaran et al. | 233—26 |
| 2,699,289 | 1/1955 | Allen et al. | 233—26 |
| 2,878,992 | 3/1959 | Pickels et al. | 233—26 X |
| 3,028,075 | 4/1962 | Blum | 233—26 |
| 3,168,473 | 2/1965 | Goda et al. | 233—26 |

FOREIGN PATENTS 557,084  8/1932  Germany.

M. CARY NELSON, *Primary Examiner.*

H. KLINKSIEK, *Assistant Examiner.*